United States Patent [19]

Hall, III

[11] Patent Number: 5,112,285
[45] Date of Patent: May 12, 1992

[54] TRANSMISSION GEAR ARRANGEMENT

[75] Inventor: Arthur Hall, III, Cicero, Ind.

[73] Assignee: General Motors Corporation, Detroit, Mich.

[21] Appl. No.: 724,300

[22] Filed: Jul. 1, 1991

[51] Int. Cl.⁵ ............................ F16H 57/08; F16H 1/46
[52] U.S. Cl. ............................ 475/280; 475/276; 475/278
[58] Field of Search ............ 475/269, 271, 276, 280, 475/281, 290, 291, 296, 297, 329, 330, 279, 278

[56] References Cited

U.S. PATENT DOCUMENTS

| | | | |
|---|---|---|---|
| 3,016,769 | 1/1962 | Christenson et al. | 475/290 X |
| 4,823,641 | 4/1989 | Kuhn et al. | 475/279 X |
| 4,914,978 | 4/1990 | Moroto et al. | 475/281 X |
| 4,976,670 | 12/1990 | Klemen | 475/330 X |

Primary Examiner—Leslie A. Braun
Assistant Examiner—David E. Henn
Attorney, Agent, or Firm—A. Michael Tucker

[57] ABSTRACT

The present gear arrangement for an automatic transmission includes one compound planetary gear unit and two simple planetary gear units. Three clutches and three brakes are selectively engaged to produce five forward and two reverse drive ratios.

7 Claims, 1 Drawing Sheet

| RANGE | CLUTCH/BRAKE | | | | | |
|---|---|---|---|---|---|---|
| | 60 | 70 | 74 | 80 | 66 | 78 |
| F1 |  | X |  | X |  | X |
| F2 | X | X |  |  |  | X |
| F3 | X | X |  | X |  |  |
| F4 | X | X |  |  | X |  |
| F5 | X | X | X |  |  |  |
| R1 |  | X | X |  |  | X |
| R2 |  |  | X | X |  | X |

TRANSMISSION GEAR ARRANGEMENT

BACKGROUND OF THE INVENTION

1. Field of the Invention

The present invention relates generally to power transmissions, and in particular is concerned with a planetary gear arrangement for an automatic transmission.

2. Description of the Related Art

Automatic and manual power transmissions for vehicles are well-known. Many automatic transmissions include a system of planetary gear units connected between a torque converter and a driven shaft. Each planetary gear unit includes a sun gear, a carrier mounting a plurality of planet or pinion gears, and a ring gear. Various clutches and brakes are utilized to engage the planetary gear units to produce the desired ratios.

Particularly in off-road and military vehicle applications, it is desirable to provide multiple reverse drive ratios as well as multiple forward drive ratios. In certain vehicles, it is desirable for one reverse ratio to be at least equal to fifty percent of the top forward ratio.

SUMMARY OF THE INVENTION

The present invention includes a power transmission having five forward drive ratios and two reverse drive ratios. One reverse drive ratio is capable of at least fifty percent of the top speed of the forward high drive ratio.

In a preferred embodiment, the present gear arrangement for an automatic transmission includes one compound planetary gear unit and two simple planetary gear units. Three clutches and three brakes are selectively engaged to produce five forward and two reverse drive ratios.

DETAILED DESCRIPTION OF THE PREFERRED EMBODIMENT

Figures 1, 2:
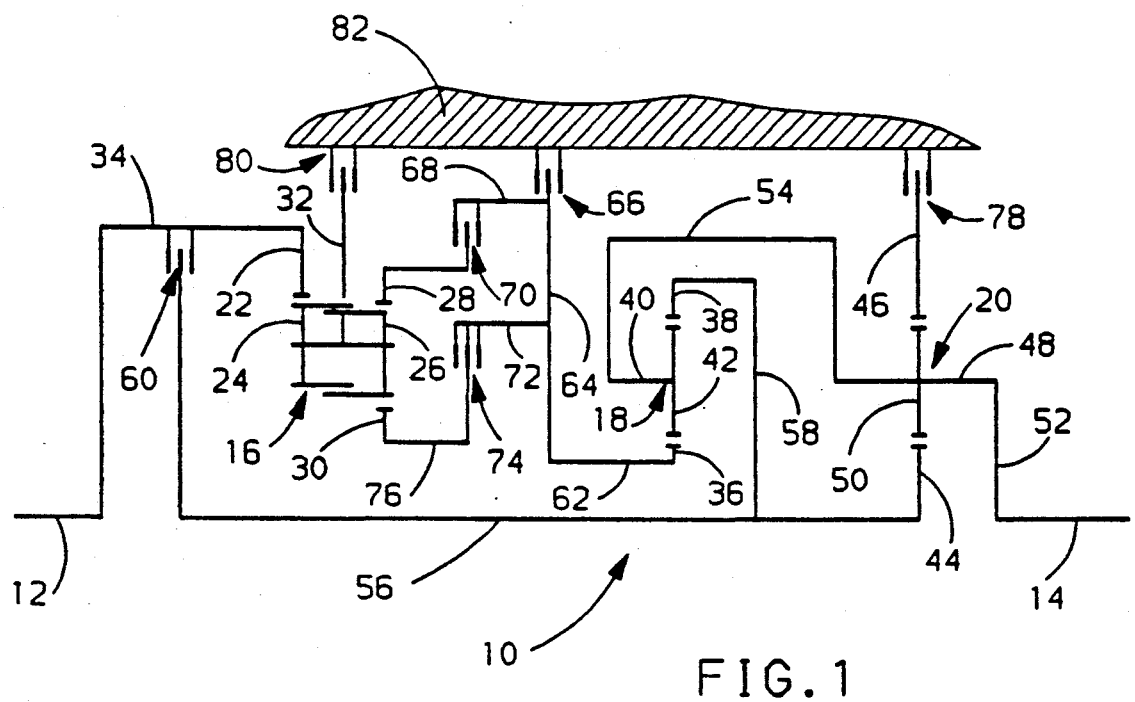
FIG. 1 is a schematic representation of a power transmission gear arrangement according to the present invention.
FIG. 2 is a table illustrating the operating sequence of clutches and brakes in the gear arrangement of FIG. 1.

A planetary gear arrangement, indicated generally at 10 in FIG. 1, includes a transmission input shaft 12, a transmission output shaft 14 aligned with the transmission input shaft 12, a compound planetary gear unit 16 and two simple planetary gear units 18 and 20. The transmission input shaft 12 is drivingly connected to a torque converter and engine (not illustrated) in a well-known manner. The transmission output shaft 14 is adapted to provide a rotary drive for a vehicle.

The compound planetary gear unit 16 includes an input ring gear 22 and a first set of planet or pinion gears 24 meshing with the input ring gear 22 and a second set of planet or pinion gears 26. The set of pinion gears 26 also mesh with an output ring gear 28 and a sun gear 30. The first and second sets of pinion gears 24 and 26 are rotatably supported on a compound planetary carrier 32. When the input and output ring gears 22 and 28 are equally sized, and the sun gear 30 has half the number of teeth of each ring gear 22 and 30, rotation of the input ring gear 22 results in equal but opposite rotation of the output ring gear 28, while the rotation of the sun gear 30 is in the same direction as that of the input ring gear 22 but at twice the speed. The input ring gear 22 is drivingly connected to the transmission input shaft 12 by a first rotating clutch housing 34.

The planetary gear unit 18 includes a sun gear 36, a ring gear 38 and a planetary carrier 40 which rotatably supports a plurality of pinion gears 42 meshing with the sun gear 36 and the ring gear 38.

The planetary gear unit 20 includes a sun gear 44, a ring gear 46 and a planetary carrier 48 which rotatably supports a plurality of pinion gears 50 which mesh with the sun gear 44 and the ring gear 46. The planetary carrier 48 is drivingly connected by a drum or hub 52 to the transmission output shaft 14 for unitary rotation. The planetary carriers 40 and 48 are interconnected by a hub 54 for unitary rotation.

The sun gear 44 of gear unit 20 is drivingly connected to a first planetary input shaft 56. The ring gear 38 of gear unit 18 is drivingly connected by a hub 58 to the planetary input shaft 56. A first rotating clutch 60 is disposed between the planetary input shaft 56 and the rotating clutch housing 34 and is selectively operable to connect the planetary input shaft 56 to the transmission input shaft 12 for rotation as a unit.

The sun gear 36 of gear unit 18 is drivingly connected to a second planetary input shaft 62. The second planetary input shaft 62 is operatively connected by a hub 64 to a first brake 66. A second rotating clutch housing 68 is drivingly connected to the hub 64. A second rotating clutch 70 is operatively connected to the output ring gear 28 of the compound planetary gear unit 16. A third rotating clutch housing 72 is drivingly connected to the hub 64. A third rotating clutch 74 is drivingly connected to an intermediate shaft 76 and the sun gear 30 and is selectively operable to connect the intermediate shaft 76 with the hub 64.

The ring gear 46 of the gear unit 20 is operatively connected to a second brake 78. The compound carrier 32 is operatively connected to a third brake 80. Brakes 66, 78 and 80 are conventional friction units which are preferably selectively operable to connect respective gear members to a stationary portion of a transmission housing 82.

The planetary gear arrangement 10 described above will provide five forward gear ratios and two reverse gear ratios. The first forward speed reduction ratio is established by the selective engagement of clutch 70 and brakes 78 and 80. With the compound carrier 32 grounded by brake 80, power transmission flow from the input ring gear 22 through the first and second sets of pinion gears 24, 26 results in equal but opposite rotation of the output ring gear 28. This negative input to the sun gear 36 through clutch 70 and hub 64 combines with a positive input to sun gear 44 through hub 58 to produce a low speed positive output of the carriers 40 and 48. The output from the carriers 40 and 48 is delivered to the output shaft 14 by the hub 52.

The second forward ratio is accomplished by releasing brake 80 and engaging clutch 60. The input from the transmission input shaft 12 to the first planetary input shaft 56, combined with the grounded ring gear 46, results in a forward speed reduction ratio.

The third forward ratio is established by disengaging brake 78 and engaging brake 80. A negative output is produced by the output ring gear 28, resulting in a negative input to sun gear 36 through hub 64. Engagement of clutch 60 provides a positive input to ring gear 38 through hub 58. A positive output is transferred from carrier 40 to carrier 48 by the hub 54, providing a forward speed reduction ratio.

To establish a fourth forward speed reduction ratio, brake 80 is disengaged and brake 66 is engaged. Input is transferred to ring gear 38 by the planetary input shaft 56 and hub 58. Sun gear 36 is grounded by brake 66. An output is provided from the carrier 40 to carrier 48 by hub 54. Although clutch 70 remains engaged, no power is transmitted since brake 66 is applied. The clutch 70 remains engaged so as not to have two shifting clutches for the ratio change.

For a fifth forward ratio, brake 66 is disengaged and clutch 74 is engaged. With clutch 60 engaged, power flows through planetary input shaft 56 to ring gear 38 at input speed. Simultaneous engagement of clutches 70 and 74 locks the compound planetary gear unit 16, resulting in an input to the sun gear 36 in the same direction and magnitude as the input to the ring gear 38. The two inputs to the planetary gear unit 18 cause the carrier 40 to rotate as a unit, resulting in a ratio of 1:1 and a mechanical efficiency of approximately 100 percent. Hub 54 delivers this output to carrier 48.

The first reverse ratio is established by disengaging clutch 60 and engaging brake 78. With clutches 70 and 74 engaged, the compound planetary gear unit 16 is locked so that a positive input is delivered to sun gear 36. This range is the same as the first forward range except that the input is in a positive direction. When both ring gears 22 and 28 have the same number of teeth, the ratio generated is equal to and opposite the first forward ratio.

The second reverse ratio is established by releasing clutch 70 and engaging brake 80. Power flows from the input ring gear 22 to sun gear 30, thereby driving the sun gear 36 through hub 64 at a speed greater than 1:1 as was done in the first reverse ratio. Remaining power transmission is the same as in the first reverse ratio, except that the speed is increased. Since sun gear 30 is used only in the second reverse ratio, it can be sized to achieve a desired ratio without affecting any of the other ranges. Thus, the sun gear 30 can be sized so that the second reverse ratio is approximately equal to fifty percent of the top speed of the fifth forward ratio.

In each of the ratios described above, three clutches and/or brakes are engaged. The clutch and brake apply schedule requires the disengagement of only one clutch/brake and the engagement of only one other clutch/brake to shift between consecutive ranges. To satisfy this sequence, it is appreciated that the clutch 70 does not carry torque while engaged in either the second or fourth forward drive ratios.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. A power transmission providing a plurality of forward and reverse drive ratios, comprising:
   (a) input means for delivering power;
   (b) first selectively engageable clutch means operatively connected to the input means;
   (c) output means for delivering power from the transmission;
   (d) compound planetary gear means drivingly connected to the input means;
   (e) first and second simple planetary gear means drivingly connected to the first clutch means;
   (f) second and third selectively engageable clutch means drivingly connected to the compound planetary gear means and operatively connected to the first simple planetary gear means;
   (g) means drivingly connecting the first and second simple planetary gear means;
   (h) means drivingly connecting the second simple planetary gear means and the output shaft; and
   (i) selectively engageable brake means cooperating with the compound planetary gear means; the first and second simple planetary gear means and the second and third clutch means to establish selected drive ratios.

2. The power transmission specified in claim 1 wherein the compound planetary gear means includes:
   (a) an input ring gear drivingly connected to the input means;
   (b) a first set of pinion gears meshed with the input ring gear;
   (c) a second set of pinion gears meshed with the first set;
   (d) an output ring gear meshed to the second set of pinion gears;
   (e) a sun gear meshed with the second set of pinion gears; and
   (f) a planetary carrier for rotatably supporting the first and second sets of pinion gears.

3. The power transmission specified in claim 2 wherein:
   (a) the output ring gear is operatively connected to the first simple planetary gear means through the second clutch means; and
   (b) the sun gear is operatively connected to the first simple planetary gear means through the third clutch means.

4. The power transmission specified in claim 3 wherein the brake means includes:
   (a) a first brake for engaging the planetary carrier of the compound planetary gear means;
   (b) a second brake for engaging a member of the first simple planetary gear means; and
   (c) a third brake for engaging a member of the second simple planetary gear means.

5. The power transmission as specified in claim 4 wherein the second and third clutch means are operatively connected to the second brake.

6. A gear arrangement for a power transmission, comprising:
   (a) input means for delivering power;
   (b) first selectively engageable clutch means operatively connected to the input means;
   (c) output means for delivering power from the transmission;
   (d) first planetary gear means for selectively establishing drive ratios within the transmission including
      (i) an input ring gear drivingly connected to the input means,
      (ii) a first set of pinion gears meshed with the input ring gear,
      (iii) a second set of pinion gears meshed with the first set,
      (iv) an output ring gear meshed with the second set of pinion gears,
      (v) a sun gear meshed with the second set of pinion gears, and (vi) a planetary carrier for rotatably supporting the first and second sets of pinion gears;

(e) second planetary gear means for selectively establishing drive ratios within the transmission including a first member drivingly connected to the first clutch means;

(f) third planetary gear means for selectively establishing drive ratios within the transmission including a first member drivingly connected to the first clutch means;

(g) first brake means for selectively engaging the planetary carrier of the first planetary gear means;

(h) second brake means for selectively engaging a second member of the second planetary gear means;

(i) second clutch means for selectively engaging the output ring gear with the second member of the second planetary gear means;

(j) third clutch means for selectively engaging the sun gear with the second member of the second planetary gear means;

(k) third brake means for engaging a second member of the third planetary gear means;

(l) means drivingly connecting the second and third planetary gear means; and (m) means drivingly connecting the third planetary gear means with the output means.

7. The gear arrangement specified in claim 6 wherein:

(a) a first forward speed reduction ratio is established by engaging the second clutch means and the first and third brake means;

(b) a second forward speed reduction ratio is established by engaging the first and second clutch means and the third brake means;

(c) a third forward speed reduction ratio is established by engaging the first and second clutch means and the first brake means;

(d) a fourth forward speed reduction ratio is established by engaging the first and second clutch means and the second brake means;

(e) a fifth forward speed ratio is established by engaging the first, second and third clutch means;

(f) a first reverse speed reduction ratio is established by engaging the second and third clutch means and the third brake means; and (g) a second reverse speed reduction ratio is established by engaging the third clutch means and the first and third brake means.

* * * * *